United States Patent
Setoyama et al.

(10) Patent No.: US 9,186,728 B2
(45) Date of Patent: Nov. 17, 2015

(54) CUTTING TOOL

(75) Inventors: Makoto Setoyama, Itami (JP); Satoru Kukino, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 623 days.

(21) Appl. No.: 13/504,836

(22) PCT Filed: Aug. 30, 2011

(86) PCT No.: PCT/JP2011/069545
§ 371 (c)(1),
(2), (4) Date: Apr. 27, 2012

(87) PCT Pub. No.: WO2012/032966
PCT Pub. Date: Mar. 15, 2012

(65) Prior Publication Data
US 2012/0213601 A1    Aug. 23, 2012

(30) Foreign Application Priority Data
Sep. 7, 2010 (JP) ................... 2010-199853

(51) Int. Cl.
B23B 27/14 (2006.01)
C22C 26/00 (2006.01)

(52) U.S. Cl.
CPC .............. B23B 27/141 (2013.01); C22C 26/00 (2013.01); B23B 2226/125 (2013.01); Y10T 407/24 (2015.01); Y10T 407/27 (2015.01)

(58) Field of Classification Search
CPC B23B 2226/125; B23B 27/141; C22C 26/00; Y10T 407/27; Y10T 407/24
USPC ........................................ 407/113–115, 119
See application file for complete search history.

(56) References Cited

U.S. PATENT DOCUMENTS 3,345,613 A * 10/1967 Bucholtz et al. ................ 378/73
3,514,818 A *  6/1970 Meadows ....................... 428/546
3,616,506 A * 11/1971 Ekemar
(Continued)

FOREIGN PATENT DOCUMENTS

CN        1538891       10/2004
JP        3-178736 A     8/1991
(Continued)

OTHER PUBLICATIONS

Office Action in Chinese Patent Application No. 2011800004744.5, dated Dec. 18, 2013.

*Primary Examiner* — Sunil K Singh
*Assistant Examiner* — Sara Addisu
(74) *Attorney, Agent, or Firm* — Venable LLP; Michael A. Sartori; Tamatane J. Aga

(57) ABSTRACT

A cutting tool having excellent chip treatability and adhesion resistance is provided. The cutting tool includes a hard sintered body in at least a cutting edge and has a rake face and a flank face. The rake face has a chip breaker in a protruded or uneven shape. The hard sintered body contains at least 20% by volume of cubic boron nitride. A region of not more than 20 μm from a surface of the hard sintered body on the rake face side includes A-structures made of cubic boron nitride and B-structures made of at least one selected from the group consisting of hexagonal boron nitride, amorphous boron nitride, and boron oxide. The volume ratio of the B-structures to the sum of the A-structures and B-structures, B/(A+B), is not less than 5% by volume and not more than 90% by volume.

8 Claims, 1 Drawing Sheet

(56) References Cited

U.S. PATENT DOCUMENTS

| | | | |
|---|---|---|---|
| 4,522,633 A * | 6/1985 | Dyer | 51/307 |
| 5,011,515 A * | 4/1991 | Frushour | 51/307 |
| 5,154,550 A * | 10/1992 | Isobe et al. | 408/144 |
| 5,584,045 A * | 12/1996 | Tanabe et al. | 428/547 |
| 5,676,496 A * | 10/1997 | Littecke et al. | 407/118 |
| 5,948,541 A * | 9/1999 | Inspektor | 428/469 |
| 6,197,134 B1 * | 3/2001 | Kanzaki et al. | 148/682 |
| 6,881,475 B2 * | 4/2005 | Ohtani et al. | 428/216 |
| 7,435,486 B2 * | 10/2008 | Dahlund et al. | 428/698 |
| 7,695,222 B2 * | 4/2010 | Omori et al. | 407/119 |
| 7,967,533 B2 * | 6/2011 | Omori et al. | 407/119 |
| 8,414,229 B2 * | 4/2013 | Can et al. | 407/118 |
| 8,481,145 B2 * | 7/2013 | Ohtomo | 428/143 |
| 8,586,214 B2 * | 11/2013 | Sakamoto et al. | 428/697 |
| 2004/0234349 A1 | 11/2004 | Ueda et al. | |
| 2009/0148249 A1 * | 6/2009 | Pretorius et al. | 408/144 |
| 2009/0181238 A1 * | 7/2009 | Can et al. | 428/325 |
| 2009/0272041 A1 | 11/2009 | Pretorius et al. | |
| 2010/0018127 A1 | 1/2010 | Can et al. | |
| 2013/0337248 A1 * | 12/2013 | Ozbayraktar | 428/216 |
| 2014/0026492 A1 * | 1/2014 | Tatsumi et al. | 51/307 |

FOREIGN PATENT DOCUMENTS

| | | |
|---|---|---|
| JP | 2003-127007 A | 5/2003 |
| JP | 2004-223648 A | 8/2004 |
| JP | 2006-281386 A | 10/2006 |
| JP | 2007-216327 A | 8/2007 |
| JP | 2010-524699 A | 7/2010 |
| JP | 2010-228088 A | 10/2010 |

\* cited by examiner

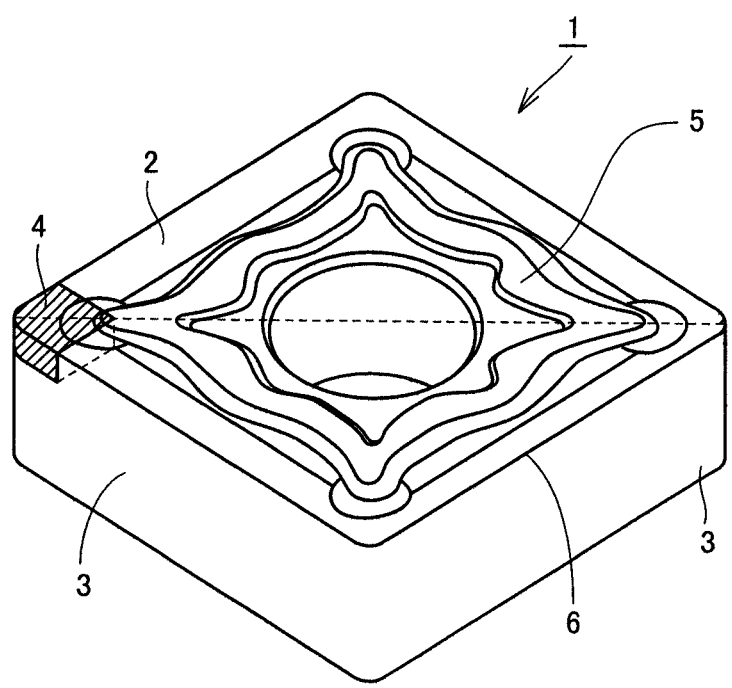

CUTTING TOOL

TECHNICAL FIELD

The present invention relates to a cutting tool including a hard sintered body containing cubic boron nitride (hereinafter also referred to as cBN).

BACKGROUND ART

A cBN-sintered-body tool produced by sintering fine cBN powder with various binders has excellent wear resistance and strength, and therefore exhibits excellent cutting performance for high-hardness iron-group metals and cast iron.

Here, the cBN sintered body is made up of cBN particles bound by a binder phase whose main components are TiN, TiC, W, Co, and Al. The cBN particles have a hardness and a heat conductivity that are second highest next to diamond, and have a superior fracture toughness to the ceramic material. The cBN sintered body having a high content of cBN particles is therefore excellent in characteristics such as plastic deformation resistance, toughness, strength, and chipping resistance.

As machine tools have become automated and production processes have become unattended in recent years, the chip treatability has become considered as an important factor indispensable for continuous running of the machine tools. In order to improve the chip treatability, generally a chip breaker is formed on a rake face of a tool, and a variety of methods are under study.

For example, Japanese Patent Laying-Open No. 3-178736 (PTL 1) discloses a method by which a rake face of a cutting tool is laser-machined or electrical discharge-machined to form a chip breaker. According to the method of PTL 1, after the chip breaker is formed, the tool is processed for the purpose of lessening damages caused in the process of forming the chip breaker, to thereby enable the cutting performance to be enhanced.

Further, Japanese Patent Laying-Open Nos. 2004-223648 (PTL 2) and 2006-281386 (PTL 3) each disclose a method by which a chip breaker is formed and thereafter its surface is processed with a loose abrasive. According to the method disclosed in PTL 2 and PTL 3, occurrence of adhesion due to surface roughness or altered structure appearing on the surface of the chip breaker is reduced, and machining damages such as internal cracks are removed. Accordingly, chipping is less likely to occur to the cutting tool.

CITATION LIST

Patent Literature

PTL 1: Japanese Patent Laying-Open No. 3-178736
PTL 2: Japanese Patent Laying-Open No. 2004-223648
PTL 3: Japanese Patent Laying-Open No. 2006-281386
PTL 4: Japanese Patent Laying-Open No. 2003-127007
PTL 5: Japanese Patent Laying-Open No. 2007-216327

SUMMARY OF INVENTION

Technical Problem

Recently, however, there have been demands for a higher speed and a higher efficiency of cutting work, and workpieces have become more difficult to cut. Because of this, rubbing of a chip of the workpiece makes it more likely that the workpiece adheres to the rake face. The cutting tools that are commonly used currently have disadvantages such as deteriorated dimensional accuracy due to adhesion of the workpiece to the rake face, increased cutting resistance resulting in occurrence of chipping, and degenerated surface texture.

In order to overcome the above-described disadvantages, it may be a direct way to make the workpiece less likely to adhere to the rake face. Currently, however, no effective means has been provided.

The present invention has been made in view of the circumstances above, and an object of the present invention is to provide a cutting tool exhibiting excellent chip treatability and adhesion resistance while keeping characteristics including chipping resistance and wear resistance.

Solution to Problem

A cutting tool of the present invention includes a hard sintered body in at least a cutting edge, and has a rake face and a flank face. The rake face has a chip breaker in a protruded or uneven shape. The hard sintered body contains at least 20% by volume of cubic boron nitride. A region of not more than 20 μm in a depth direction from a surface of the hard sintered body on the rake face side includes A-structures made of cubic boron nitride and B-structures made of at least one selected from the group consisting of hexagonal boron nitride, amorphous boron nitride, and boron oxide. A volume ratio of the B-structures to a sum of the A-structures and the B-structures (B/(A+B)) is not less than 5% by volume and not more than 90% by volume.

Preferably, the cutting tool has a face connecting the rake face and the flank face, and the face includes at least one face selected from the group consisting of a land face, a negative land face, and honing portion. A region of not more than 20 μm in the depth direction from a surface of the face has the volume ratio B/(A+B) of not less than 0.1% by volume and not more than 5% by volume.

Preferably, the cutting tool has a face connecting the rake face and the flank face, and the face includes at least one face selected from the group consisting of a land face, a negative land face, and a honing portion. In a region of not more than 10 μm from a ridgeline where any two of the rake face, the flank face, the land face, the negative land face, and the honing portion abut on each other, the volume ratio B/(A+B) is not less than 0.1% by volume and not more than 5% by volume.

Preferably, in the hard sintered body, regions each containing at least 90% by volume of the B-structures are scattered over the A-structures.

Preferably, Ih (0001)/Ic (111) is not less than 0.1 and not more than 10, where Ic (111) is an integrated intensity of x-ray diffraction of a (111) plane of the cubic boron nitride and Ih (0001) is an integrated intensity of x-ray diffraction of a (0001) plane of the hexagonal boron nitride, when x-ray diffraction is performed on the hard sintered body on the rake face side.

Preferably, an integrated intensity of a background component except for a clear diffraction peak of $2\theta=10$ to $30°$ when x-ray diffraction is performed on the surface of the hard sintered body on the rake face side is not less than 1.1 times and not more than 10 times as high as an integrated intensity of a background component except for a clear diffraction peak of $2\theta=10$ to $30°$ when x-ray diffraction is performed on a surface obtained by cutting the surface of the hard sintered body on the rake face side by at least 0.4 mm.

Preferably, IBO/(IBO+IBN) is not less than 0.05 and not more than 0.9, where IBN is an integrated intensity of a signal of B representing B—N bond and IBO is an integrated intensity of a signal of B representing B—O bond, when XPS analysis is performed on the hard sintered body on the rake face side.

Advantageous Effects of Invention

The cutting tool of the present invention has the above-described components and features to thereby exhibit excellent chip treatability and adhesion resistance while keeping chipping resistance and wear resistance.

BRIEF DESCRIPTION OF DRAWINGS

FIG. 1 is a schematic cross section of a cutting tool of the present invention.

DESCRIPTION OF EMBODIMENTS

In the following, the components and features of the cutting tool of the present invention will each be further described.

<Cutting Tool>

FIG. 1 is a schematic cross section of a cutting tool of the present invention. Cutting tool 1 of the present invention as shown in FIG. 1 has a rake face 2 that contacts a chip of a workpiece and a flank face 3 that contacts the workpiece itself, when cutting work is being done, and includes a hard sintered body 4 in at least a cutting edge.

The cutting tool of the present invention can be used highly advantageously as, for example, an indexable insert for drilling, end-milling, milling, or machining, a metal-slitting saw, a gear cutting tool, a reamer, a tap, a cutting insert for pin-milling of a crankshaft, or the like.

Such a cutting tool may assume any of the negative shape and the positive shape. The negative shape is advantageous in that both sides of the cutting tool are available for use in cutting and therefore the number of available cutting edges per cutting insert is greater, and is thus more preferred.

In FIG. 1, a ridgeline 6 where rake face 2 and flank face 3 abut on each other is not processed and therefore has a sharp edge. Ridgeline 6, however, may be processed so that at least one selected from the group consisting of a land face, a negative land face, and a honing portion is formed on a face which connects rake face 2 and flank face 3 to each other. Regarding the land face, negative land face, and honing portion, a further description will be given later herein.

While FIG. 1 shows cutting tool 1 having hard sintered body 4 bonded to only a cutting edge of the base material of the tool, the cutting tool is not limited to this form in which hard sintered body 4 is provided at such a position. Thus, hard sintered body 4 may be provided at any site other than the cutting edge of cutting tool 1. Further, while FIG. 1 shows the hard sintered body which is provided at only one cutting edge of the cutting tool, it is apparently seen that hard sintered bodies may be provided at two or more cutting edge. Regarding the present invention, "cutting edge" refers to an apical angle part of cutting tool 1 that is involved in cutting.

<Rake Face>

Rake face 2 which is a constituent part of cutting tool 1 of the present invention refers to a face that contacts a chip of a workpiece when cutting work is being done. For example, the top surface and the bottom surface of the cutting tool shown in FIG. 1 are each rake face 2. Such rake face 2 is characterized in that it has a chip breaker 5 in a protruded or uneven shape. Since chip breaker 5 is provided, the chip is curled and broken into fine fragments of an appropriate size. Therefore, the chip is less likely to be caught, and the cutting work can smoothly be done.

<Flank Face>

Flank face 3 which is a constituent part of cutting tool 1 of the present invention refers to a face that contacts the workpiece itself when cutting work is being done. For example, the side surface of cutting tool 1 shown in FIG. 1 is flank face 3.

<Hard Sintered Body>

Cutting tool 1 of the present invention is provided with hard sintered body 4 in at least one of cutting edges of the cutting tool. At least a region within 20 μm in the depth direction from a surface on a rake face side of this hard sintered body 4 contains A-structures made of cubic boron nitride and B-structures made of at least one selected from the group consisting of hexagonal boron nitride, amorphous boron nitride, and boron oxide. The volume ratio of the B-structures to the sum of the A-structures and the B-structures, B/(A+B), is not less than 5% by volume and not more than 90% by volume.

The A-structures and the B-structures are contained at this ratio to thereby provide both the characteristics of the A-structures that are excellent wear resistance and strength and the characteristics of the B-structures that are excellent slidability and adhesion resistance. Thus, a cutting tool having wear resistance, strength, slidability, and adhesion resistance together can be obtained.

Since hard sintered body 4 having the above-described features is included in at least the cutting edge, the chip is less likely to adhere to rake face 2, and the cutting tool can be used for cutting various workpieces. Thus, cutting tool 1 has the improved chip treatability and can accordingly be used under a wide variety of cutting conditions.

For example, in the case of cutting work of a workpiece such as sintered alloy or difficult-to-cut cast iron from which fine chips are generated while the cutting work is being done, the wear resistance of a chip-rubbing portion of the rake face is reduced. Accordingly, heat generation due to the wear resistance of the chip-rubbing portion is suppressed, and crater wear resultant from high-speed machining can be suppressed.

In the case of cutting work of a workpiece such as hardened steel or steel from which a long chip is generated while the cutting work is being done, the slidability and the adhesion resistance of the rake face can be improved. Accordingly, the chip can be ejected smoothly and therefore the cutting resistance is reduced and the rake face is less likely to wear.

In the case of the conventional cutting tools, when the chip sticking to the rake face is accumulated and the accumulated chip drops off, constituent components of the hard sintered body are also peeled off simultaneously with dropping of the chip, and therefore, crater wear is likely to occur. However, since the B-structures with excellent adhesion resistance are contained as described above, peeling of the adhering chip is facilitated, and the crater wear can be reduced.

In a region of 20 μm or less in the depth direction from the surface on the rake face side of the hard sintered body, if the volume ratio of the B-structures is less than 5% by volume, namely the volume ratio of the A-structures to the sum of the A-structures and the B-structures, A/(A+B), exceeds 95%, a part of a rubbing chip adheres to the rake face and the surface of the chip breaker, resulting in a disadvantage that the flow of the chip is hindered and the cutting resistance is increased. Moreover, when the adhering chip is brought into contact with a new chip and peeled off, a part of the hard sintered body is also peeled off, which makes it likely that crater wear of rake face 2 proceeds.

In contrast, if the volume ratio of the B-structures, B/(A+B), is higher than 90% by volume, there is a disadvantage that the wear resistance of hard sintered body 4 is low. Thus, while excellent characteristics are exhibited initially in a cutting process, the B-structures abrade in an early stage and the effect of the adhesion resistance is not maintained for a long period of time. In terms of the balance between wear resistance, strength, slidability, and adhesion resistance, the above-described volume ratio of the B-structures, B/(A+B), is preferably not lower than 10% by volume and not higher than 70% by volume, and more preferably not lower than 25% by volume and not higher than 50% by volume. Here, the present invention uses a numerical value measured by means of x-ray diffraction, as the value representing the volume ratio between the A-structures and the B-structures.

For the present invention, it is preferable to perform, on the A-structures, electrical discharge machining, electron beam machining, laser machining, or plasma arc machining to apply a certain energy to the A-structures and thereby transform the A-structures into B-structures. The B-structures can thus be formed to provide a crystal structure in which the A-structures and the B-structures are mixed, while a compact structure of the hard sintered body is kept.

Here, the form of the mixture of the A-structures and the B-structures in a region of 20 μm or less from the surface on the rake face side of hard sintered body 4 may be a mixture of atoms, or the A-structures and the B-structures may be scattered separately. It is however more preferable that the A-structures substantially form a base network and the B-structures are scattered over this network. Since the B-structures are scattered over the network of the A-structures, the wear resistance and the adhesion resistance can be improved relative to the case where the A-structures and B-structures are merely mixed separately or in the form of layers or atoms. In the case where the B-structures are thus included in such a manner that they are scattered over the network of the A-structures, if the B-structures are abraded while the cutting work is done, the A-structures surrounding the B-structures prevent further abrasion of the B-structures. In addition, even if the A-structures adhere to the workpiece while the cutting work is done, the scattered B-structures do not adhere to the workpiece. Therefore, the area where the workpiece adheres to the rake face is small, which makes it more likely that the adhered fragments of the workpiece are peeled off and makes it less likely that the A-structures drop off together with the adhered fragments of the workpiece.

Here, the state "B-structures are scattered" refers to a state where regions each containing at least 90% by volume of B-structures (hereinafter also referred to as "regions of B-structures") are present separately from other regions, when the crystal structure of the hard sintered body on the rake face side is analyzed with a transmission electron microscope or by means of another method, or the state of distribution of boron, nitrogen, and oxygen forming the hard sintered body is observed.

In such a case where the B-structures are scattered over the network of the A-structures, the average diameter of the regions of the B-structures is preferably not less than 0.5 μm and not more than 50 μm, and more preferably not less than 0.5 μm and not more than 10 μm. If it is less than 0.5 μm, the effect of the B-structures of improving the slidability and the adhesion resistance cannot adequately be obtained. If it is more than 50 μm, local abrasion of the B-structures occurs, and therefore, the tool life cannot be improved.

While the regions of the B-structures are not necessarily circular, the average diameter of the regions is indicated for the sake of convenience in order to define the area occupied by the B-structures in the hard sintered body on the rake face side. In order to calculate the average diameter of the regions of the B-structures, electron back scattering pattern (EBSP) analysis is conducted first to measure the surface of the hard sintered body. Then, the area of a region in which crystal grains having the same structure gather is calculated, and the diameter of a circle having the same area as the calculated area is calculated. This operation is carried out at least ten times, and the average of respective diameters of the circles is calculated for use as the average of diameters of the regions of the A-structures and the B-structures.

The B-structures are preferably present in a region of not less than 0.5 μm and not more than 20 μm in the direction of the depth from the surface of the rake face. In terms of applicability to a wide variety of uses, they are preferably present in a region of a depth of 10 μm or less. More preferably, the B-structures are present in a region of a depth of 5 μm or less. If the B-structures are contained in a range of a depth of less than 0.5 μm, the effect of the B-structures of suppressing abrasion cannot adequately be obtained. Moreover, early abrasion of the B-structures occurs in the initial stage from the start of cutting, and the effect of the B-structures of abrasion resistance is lost in an early stage. In contrast, if the B-structures are contained in a region of a depth exceeding 20 μm, the strength of the hard sintered body deteriorates considerably.

Here, "depth from the surface of the rake face" is calculated in the following manner. A cross section perpendicular to the rake face of the hard sintered body is observed with a scanning electron microscope (SEM) or transmission electron microscope (TEM) and then analyzed by means of transmission electron diffraction (TED). At this time, the maximum depth at which the B-structures are detected is calculated as the depth from the surface of the rake face. As to the above-described "depth from the surface of the rake face," while sputtering is performed on the surface of the rake face, the oxygen content and the amount of B—O bonds in the depth direction are measured by means of XPS analysis, and the depth at which the B—O bonds are no more detected or the B—O bonds become less than 5% of the B—O bonds of the surface region is used as the value of the aforementioned depth from the surface of the rake face.

In the case where hexagonal boron nitride is contained as the B-structures, it is preferable that the ratio Ih (0001)/Ic (111) is not less than 0.1 and not more than 10, more preferably not less than 0.2 and not more than 1.5, and still more preferably not less than 0.3 and not more than 1, where Ic (111) is an integrated intensity of x-ray diffraction of the (111) plane of cBN and Ih (0001) is an integrated intensity of x-ray diffraction of the (0001) plane of hexagonal boron nitride, when x-ray diffraction is performed on the hard sintered body on the rake face side. When this ratio of the crystal structure of the hard sintered body is exhibited, an optimum mixture ratio of hexagonal boron nitride is obtained, and the tool life can be extended.

In the case where amorphous boron nitride is contained as the B-structures, the integrated intensity of a background component except for a clear diffraction peak of 2θ=10 to 30° when x-ray diffraction is performed on the surface of the hard sintered body on the rake face side is preferably not less than 1.1 times and not more than 10 times and more preferably not less than 1.1 times and not more than twice as high as the integrated intensity of a background component except for a clear diffraction peak of within 2θ=10 to 30° when x-ray diffraction is performed on a surface obtained by cutting the surface of the hard sintered body on the rake face side by at least 0.4 mm. When this ratio of the integrated intensity of the background component is exhibited, an optimum mixture ratio of the amorphous component is obtained, and the tool life can be extended.

Further, in the case where boron oxide is contained as the B-structures, IBO/(IBO+IBN) is preferably not less than 0.05 and not more than 0.9, more preferably not less than 0.1 and not more than 0.5, and still more preferably not less than 0.25 and not more than 0.4, where IBN is an integrated intensity of a signal of B representing B—N bond and IBO is an integrated intensity of a signal of B representing B—O bond, when XPS analysis is performed on the hard sintered body on the rake face side.

<Cubic Boron Nitride>

The above-described hard sintered body 4 has a feature that it contains at least 20% by volume of cubic boron nitride. If it is less than 20% by volume, the volume ratio of the B-structures in the hard sintered body is inevitably lower, and thus the effect of improving slidability and adhesion resistance cannot adequately be obtained.

Regarding the present invention, in the case where hard sintered body 4 contains not less than 20% by volume and less than 85% by volume of cBN, preferably a binder phase is contained as a component other than the cBN. Such a binder phase preferably contains: a compound of at least one element selected from the group consisting of group IVa elements, group Va elements, group VIa elements, Al, and Si in the periodic table, and at least one element selected from the group consisting of nitrogen, carbon, boron, and oxygen, or a solid solution of the compound; and one of or both metals Co and Ni, or a compound of the metal(s) and at least one element selected from the group consisting of nitrogen, carbon, boron, and oxygen, or a solid solution of the compound. The hard sintered body of such a composition has excellent cutting performance for cutting a variety of workpieces.

Regarding the present invention, in the case where hard sintered body 4 contains not less than 85% by volume and not more than 98% by volume of cBN, the binder phase preferably contains Co and/or a compound of Co and at least one element selected from the group consisting of nitrogen, carbon, boron, and oxygen, or a solid solution of the compound. In the case where it contains not less than 85% by volume and not more than 98% by volume of cBN and the above-described components, the slidability and the adhesion resistance can remarkably be improved. In this case, if the volume ratio of the B-structures (B/(A+B)) in a region of 20 µm or less from the surface of the hard sintered body on the rake face side is not less than 5% by volume and not more than 50% by volume, the wear resistance and the strength can be prevented from being deteriorated. The hard sintered body may contain at least 99% by volume of cBN.

<Base Material of the Tool>

Regarding the present invention, the tool's base material to which hard sintered body 4 is bonded may be any as long as it is conventionally known as a tool's base material of this type, and is not particularly limited. For example, as a tool's base material, a material capable of enduring machining resistance such as cemented carbide, steel, or ceramic material may appropriately be used. Cemented carbide for example may be used as such a base material of the tool. In particular, in terms of the material strength for example of the tool's base material, cemented carbide is more suitably used.

<Honing Portion>

In cutting tool 1 of the present invention, a ridgeline portion where rake face 2 and flank face 3 abut on each other is preferably provided with a honing portion. The honing portion refers to a portion rounded by cutting a ridgeline portion where rake face 2 and flank face 3 abut on each other. The width of the honing portion is optimized depending on the machining conditions. A smaller width of the honing portion provides an improved sharpness of the tool and a larger width thereof provides an increased strength of the cutting edge. This width of the honing portion is preferably not less than 1 µm and not more than 50 µm.

<Land Face and Negative Land Face>

In cutting tool 1 of the present invention, a ridgeline portion where rake face 2 and flank face 3 abut on each other may be provided with a land face or a negative land face. The land face refers to a portion that is located between the cutting edge's ridgeline and the chip breaker on the rake face and is parallel to the bottom surface (rake face) of the cutting tool. The negative land face refers to a portion that is formed by chamfering the rake face and the flank face, or the land face and the rake face, or another negative land face and the flank face. These land face and negative land face may not necessarily be provided, and the cutting tool having a sharp edge without land face and negative land face may be provided.

The land face and the negative land face are each formed so that it occupies a region of preferably not less than 0.01 mm and not more than 0.3 mm, and more preferably not less than 0.01 mm and not more than 0.2 mm, from the edge's ridgeline.

The width of the land face and the negative land face each is preferably not less than 0.05 mm and not more than 3 mm. A larger width of the land face and the negative land face can provide an increased strength of the cutting edge and improve the chipping resistance. In contrast, a smaller width thereof can reduce the cutting resistance and improve the adhesion resistance.

The angle of the negative land face is preferably not less than 5° and not more than 65°. A greater angle of the negative land can provide an increased strength of the cutting edge and improve the chipping resistance. In contrast, a smaller angle thereof can reduce the cutting resistance and improve the adhesion resistance.

<Crystal Structure in the Vicinity of Cutting Edge's Ridgeline>

As to the distribution of the B-structures in the hard sintered body, the amount of mixed B-structures may be made smaller, namely the amount of mixed A-structures may be made larger as the distance from the ridgeline is smaller, to thereby enable the wear resistance and the high strength of the cutting edge to be improved. In contrast, the amount of mixed B-structures may be made larger as the distance from the ridgeline is larger, to thereby provide excellent slidability and adhesion resistance in a region where a chip is rubbing, so that the chip can smoothly be ejected.

Thus, while the slidability against rubbing of the chip and the workpiece is important for the ridgeline and its vicinity, the wear resistance and the strength are also necessary since a large impact is applied to this region.

Therefore, it is preferable that the volume ratio of the B-structures in the ridgeline and a region within 10 µm from the ridgeline is considerably low or substantially zero. When XPS is applied for example, it is more preferable that a signal corresponding to the B-structures is to such an extent that cannot substantially be confirmed. It is still more preferable that the volume ratio of the B-structures, B/(A+B), is not less than 0.1% by volume and not more than 5% by volume. In such a case, a cutting tool that has a high strength of the cutting edge and is less likely to be chipped can be produced. If the volume ratio of the B-structures is less than 0.1% by volume, the slidability and the adhesion resistance of the cutting edge are insufficient. If the volume ratio of the B-structures is higher than 5% by volume, the strength and the wear resistance are insufficient, resulting in abrasion or chipping of the ridgeline and accordingly an increased resistance of the cutting edge and deteriorated chip ejection.

In the case where a land face, a negative land face, and a honing portion are to be formed in the vicinity of the ridgeline, a large impact is applied to these portions each or the ridgeline formed by these portions each and the rake face or the flank face, as well as the ridgeline of the rake face, and therefore, the wear resistance and the strength are also required. In view of this, the volume ratio of the B-structures, B/(A+B), of the above-described faces is preferably very low, or substantially zero. More preferably, the volume ratio of the B-structures, B/(A+B), is not less than 0.1% by volume and not more than 5% by volume.

<Method for Manufacturing Cutting Tool>

The cutting tool of the present invention is manufactured by means of the following method. First, cBN particles and material powder which forms a binder phase are sintered to thereby produce a hard sintered body containing A-structures. This hard sintered body is bonded to a tool's base material with a bonding material to thereby form a cutting tool. Then, surface treatment is performed on the rake face of this cutting tool to thereby form a chip breaker and transform the A-structures into B-structures. In this way, the cutting tool of the present invention is produced. In the following, the method for manufacturing the cutting tool of the present invention will specifically be described.

Hard sintered body 4 used for the present invention is produced by means of the following method. First, the cBN particles and the material powder which forms the binder phase are introduced into an ultrahigh-pressure apparatus, and these particles are subjected to ultrahigh-pressure sintering to thereby produce a bulk sintered body. The bulk sintered body is set in an electrical discharge machine, and thereafter a brass wire is used to cut the bulk sintered body into a desired shape. The cut surface is polished so that hard sintered body 4 is obtained.

The bonding material is held between hard sintered body 4 thus produced and the tool's base material and they are placed in a vacuum furnace. Then, the pressure in the vacuum furnace is reduced to $2 \times 10^{-2}$ Pa or less and the temperature in the furnace is set at 750° C. or more to thereby melt the bonding material so that hard sintered body 4 and the tool's base material are bonded together.

Next, the bonded hard sintered body 4 and the tool's base material are cooled so that the melt bonding material is solidified. Then, the plane where hard sintered body 4 and the tool's base material are bonded to each other is polished to thereby make smooth the plane where hard sintered body 4 and tool's base material are bonded together. Thus, the cutting tool on which a chip breaker has not been formed is produced.

Then, on the rake face of the cutting tool, surface treatment is performed for removing the sintered body at a high speed to thereby form the chip breaker. At this time, a damaged layer which is formed together with the chip breaker in the vicinity of the chip breaker is removed by brushing or blasting. Here, the machining method used for the surface treatment may include electrical discharge machining, electron beam machining, laser machining, and plasma arc machining. Details of conditions for these machining processes will be described later herein.

Then, the hard sintered body on the rake face side is subjected to any of the above-listed surface treatment processes under alleviated machining conditions to thereby transform the A-structures into B-structures. Thus, the chip breaker and the B-structures are formed under different surface treatment conditions, so that the size and the depth of the regions of B-structures and the amount of mixed B-structures can more precisely be controlled. Here, when the chip breaker is formed, the B-structures may be formed simultaneously with the chip breaker. In this case, it is preferable that the surface treatment conditions under which the chip breaker is formed may be changed as appropriate.

In this way, the surface treatment is performed on the A-structures to form the B-structures, and accordingly the B-structures which improve the slidability and adhesion resistance are finely scattered over the network of the A-structures which have excellent wear resistance and strength. Accordingly, a hard sintered body having a surface structure excellent in wear resistance, strength, slidability, and adhesion resistance can be formed.

Here, the surface treatment for forming the B-structures may be performed continuously in terms of the space, or intermittently in such a manner that the surface treatment is partially done. When the surface treatment is partially done, a mask or the like may be used. Any of these methods can be used to adjust the size of the regions of the B-structures and the amount of the mixed regions of the B-structures, and a more compact structure can be provided.

<Method for Surface Treatment>

Conditions under which the aforementioned surface treatment methods are carried out will hereinafter be described specifically. Preferably, any of the following surface treatment methods is performed to transform the A-structures in the surface of the hard sintered body into B-structures.

(1) Electrical Discharge Machining

The cutting tool including the hard sintered body is set in an electrical discharge machine. The discharge current per unit area of the surface to be processed and per unit time is adjusted to ½ to 1/100 relative to the discharge current used for forming the chip breaker, and the surface treatment is done. The shape of the wire is preferably a bent shape or in the shape of a needle, depending on the surface to be processed.

(2) Electron Beam Machining

Regarding the electron beam machining, the cutting tool including the hard sintered body is first placed in a vacuum vessel, and thereafter the pressure in the vacuum vessel is reduced to 0.03 Pa. Then, argon gas and oxygen gas are introduced into the vacuum vessel, and the internal pressure of the vessel is set to 0.05 Pa. Then, to the surface of the hard sintered body on the rake face side, an electron beam is applied approximately 10000 times to thereby change a part of the A-structures in the surface of the hard sintered body into B-structures. Here, the amount of energy of the electron beam is preferably not less than 0.1 J/cm$^2$ and not more than 5 J/cm$^2$, and the electron-beam application time per application of the electron beam is preferably not shorter than one second and not longer than 100 seconds.

(3) Laser Machining

Regarding the laser machining, the surface of the hard sintered body on the rake face side is oriented so that this surface is the top surface, and the cutting tool is placed in a laser machining apparatus. Then, the output of the laser machining apparatus is set to not less than 1 W and not more than 100 W (preferably not less than 10 W), and a laser beam having a spot size of 60 μm is applied to the surface of the hard sintered body on the rake face side, to thereby change the A-structures in the surface of the hard sintered body into B-structures. Here, the frequency of the laser beam is preferably not less than 5 Hz and not more than 100 kHz.

(4) Plasma Arc Machining

The plasma arc machining is preferably performed in the following manner. The hard sintered body is first placed on an electrode of a vacuum vessel, and the pressure of the vacuum vessel is reduced to create a vacuum of 0.1 Pa or less. After this, argon and oxygen are introduced into the vacuum vessel, and the internal pressure of the vessel is increased to not less than 0.1 Pa and not more than 10 Pa. Then, high-frequency electric power is applied to the hard sintered body to generate a plasma and thereby transform the A-structures in the surface of the hard sintered body on the rake face side into B-structures. Here, the oscillation frequency of the high-frequency electric power is preferably not less than 1 MHz and not more than 100 MHz, and the output thereof is preferably not less than 500 W and not more than 5000 W. Further, the ratio between argon and oxygen introduced into the vacuum vessel can be adjusted to improve the efficiency of conversion from the A-structures into the B-structures.

EXAMPLES

In the following, the present invention will be described in more detail with reference to Examples. The present invention, however, is not limited to them.

Example 1

A cutting tool was produced in the following manner. First, TiN powder having an average particle size of 20 µm and Al powder having an average particle size of 20 µm were mixed so that the mass ratio TiN:Al was 4:1. Then, this mixture was heat-treated in a vacuum at 1250° C. for 30 minutes. The mixture obtained through the heat treatment was pulverized using cemented-carbide balls of φ4 mm and a cemented-carbide pot to thereby obtain material powder forming a binder phase.

Then, the material powder thus obtained to form the binder phase and cBN particles having an average particle size of 4 µm were blended so that the cBN content was 25% by volume. The blend was placed in a vacuum furnace, heated to 950° C. and thereafter kept for 30 minutes to thereby degas the material powder and cBN particles.

Then, the degassed material powder and cBN particles were stacked on a support plate made of cemented carbide and put in a capsule made of Nb. Then, the powder and particles were placed together with the capsule in an ultrahigh-pressure apparatus. The pressure in the ultrahigh-pressure apparatus was set to 5 GPa, and they were sintered at 1300° C. for 20 minutes. Subsequently, the sintered body was removed from the capsule, and the sintered body was ground and further polished to shape the sintered body. A plate-like bulk sintered body was thus produced.

The bulk sintered body thus obtained was cut by means of a brass wire of an electrical discharge machine. Accordingly, the hard sintered body was obtained that was in the shape of a triangular prism having an isosceles triangle base whose two sides were each 2 mm and whose apical angle between the two sides was 80°, and having a thickness of 1.2 mm. This hard sintered body was soaked in pure water and exposed to ultrasonic waves of 100 W for 10 minutes, and the surface of the cBN sintered body was ultrasonically washed with pure water.

Then, a tool's base material of cemented carbide was prepared, a bonding material made up of Ti, Zr, Cu, and Ni was provided on the interface between the cBN sintered body and the tool's base material, and they were placed in a vacuum furnace. Then, the pressure in the vacuum furnace was set to $1 \times 10^{-2}$ Pa and the internal temperature of the furnace was raised to 850° C. to thereby bond the hard sintered body to the tool's base material.

After this, the tool's base material to which the hard sintered body was bonded was removed from the reaction furnace and left to be cooled. Then, the plane where the hard sintered body and the tool's base material were bonded to each other was finished by being polished. In this way, the cutting tool having the shape of ISO number CNMA120408 and having a cutting edge in which the hard sintered body was included was produced.

To the rake face of the cutting tool thus produced, an electron beam with an intensity of 10 $J/cm^2$ was applied to form a chip breaker. At this time, a part of cBN near the chip breaker was changed into B-structures such as hexagonal boron nitride. The B-structures were removed by means of a loose abrasive. Subsequently, to the rake face, an electron beam having an intensity of 25 $J/cm^2$ was applied at an appropriate scan speed to transform the A-structures forming the surface of the hard sintered body on the rake face side, into B-structures of hexagonal boron nitride.

Next, on the ridgeline where the rake face and the flank face abutted on each other, a negative land face of an angle of 25° and a width of 0.1 mm was formed by means of a diamond abrasive. Then, a brush holding SiC abrasive grains was used to remove B-structures in the vicinity of the ridgeline.

Examples 2-8, Comparative Example 1

Respective cutting tools of Examples 2 to 8 and Comparative Example 1 were produced by a similar method to Example 1 except that the volume ratio of cBN contained in the hard sintered body was different from the cutting tool of Example 1, as shown in the column of "cBN content" in Table 1.

Examples 9-16, Comparative Example 2

Respective cutting tools of Examples 9 to 16 and Comparative Example 2 were produced by a similar method to Example 1 except that: the volume ratio of cBN contained in the hard sintered body was different from the cutting tool of Example 1 as shown in the column of "cBN content" in Table 1; the intensity and the scan speed of the applied electron beam were changed; and the amount of the portion removed with the brush was different. Regarding the cutting tools thus produced, the volume ratio of the B-structures is different as shown in the column of "volume ratio of B-structures" in Table 1, and the x-ray intensity ratio of the rake face is different as shown in the column "x-ray intensity ratio Ih (0001)/Ic (100)" in Table 1. For the cutting tool of Example 14, the B-structures in the vicinity of the ridgeline were not removed.

Comparative Example 3

The cutting tool of Comparative Example 3 was produced by a similar method to Example 9 except that the electron-beam processing for forming B-structures was not performed.

Comparative Example 4

The cutting tool of Comparative Example 4 was produced by a similar method to Example 9 except that the electron-beam processing was performed on the whole surface of the hard sintered body on the rake face side so that the whole surface of the hard sintered body on the rake face side was made up of B-structures.

TABLE 1

| | cBN content (%) | B-Structure | state of mixture | average diameter of B-structure regions (μm) | x-ray intensity ratio Ih (0001)/Ic (111) | depth of presence of B-structure (μm) | volume ratio of B-structures (vol %) | | |
|---|---|---|---|---|---|---|---|---|---|
| | | | | | | | surface region | negative land face | edge ridgeline |
| Example 1 | 25 | hexagonal boron nitride | B-structures are scattered over A-structures | 10 | 0.1 | 1 | 35 | undetected | undetected |
| Example 2 | 45 | hexagonal boron nitride | B-structures are scattered over A-structures | 10 | 0.1 | 1 | 35 | undetected | undetected |
| Example 3 | 65 | hexagonal boron nitride | B-structures are scattered over A-structures | 10 | 0.1 | 1 | 35 | undetected | undetected |
| Example 4 | 75 | hexagonal boron nitride | B-structures are scattered over A-structures | 10 | 0.1 | 1 | 35 | undetected | undetected |
| Example 5 | 85 | hexagonal boron nitride | B-structures are scattered over A-structures | 10 | 0.1 | 1 | 35 | undetected | undetected |
| Example 6 | 90 | hexagonal boron nitride | B-structures are scattered over A-structures | 10 | 0.1 | 1 | 35 | undetected | undetected |
| Example 7 | 95 | hexagonal boron nitride | B-structures are scattered over A-structures | 10 | 0.1 | 1 | 35 | undetected | undetected |
| Example 8 | 99 | hexagonal boron nitride | B-structures are scattered over A-structures | 10 | 0.1 | 1 | 35 | undetected | undetected |
| Comparative Example 1 | 10 | hexagonal boron nitride | B-structures are scattered over A-structures | 10 | 0.1 | 1 | 35 | undetected | undetected |
| Example 9 | 60 | hexagonal boron nitride | B-structures are scattered over A-structures | 1 | 0.05 | 2 | 7 | undetected | undetected |
| Example 10 | 60 | hexagonal boron nitride | A- and B-structures are mixed with each other | 1 | 0.22 | 2 | 20 | undetected | undetected |
| Example 11 | 60 | hexagonal boron nitride | A- and B-structures are mixed with each other | 1 | 0.35 | 2 | 30 | undetected | undetected |
| Example 12 | 60 | hexagonal boron nitride | A- and B-structures are mixed with each other | 1 | 0.41 | 2 | 35 | undetected | undetected |
| Example 13 | 60 | hexagonal boron nitride | A- and B-structures are mixed with each other | 1 | 0.6 | 2 | 45 | undetected | undetected |
| Example 14 | 60 | hexagonal boron nitride | A- and B-structures are mixed with each other | 1 | 0.8 | 2 | 60 | 0.1 | 0.5 |
| Example 15 | 60 | hexagonal boron nitride | A- and B-structures are mixed with each other | 1 | 0.8 | 2 | 60 | 60 | 60 |
| Example 16 | 60 | hexagonal boron nitride | A-structures are scattered over B-structures | 1 | 1.1 | 2 | 85 | 2 | 4 |
| Comparative Example 2 | 60 | hexagonal boron nitride | B-structures are scattered over A-structures | 1 | — | 2 | 3 | undetected | undetected |
| Comparative Example 3 | 60 | hexagonal boron nitride | no B-structures | — | — | — | 0 | undetected | undetected |
| Comparative Example 4 | 60 | hexagonal boron nitride | B-structures only | — | — | 5 | 99 | undetected | 99 |

Examples 17-23

Respective cutting tools of Examples 17 to 23 were produced by a similar method to Example 3 except that a laser beam was applied in the air instead of applying the electron beam, which is different from the cutting tool of Example 3. As to the laser beam, it was applied ten times at a pitch of 100 μm and respective positions displaced by 20 μm from each other.

For Examples 17 to 23, the size of the laser beam was changed to thereby adjust the size of B-structures, and the time for which the laser beam was applied was changed to thereby adjust the average diameter of the regions of B-structures. The cutting tools thus produced have respective average diameters of the regions of B-structures that are different from each other, as shown in the column of "average diameter of B-structure regions" in Table 2.

Examples 24-30

By a similar method to Example 1, a hard sintered body was bonded to a tool's base material to obtain a cutting tool. To the rake face of the cutting tool, a laser beam was applied in the air to thereby form a chip breaker. B-structures in the vicinity of the chip breaker were removed by means of a loose abrasive. After this, under a reduced pressure, plasma machining was performed in an atmosphere containing argon and oxygen. Accordingly, B-structures were formed in the surface of the hard sintered body on the rake face side. After this, by a similar method to Example 1, respective cutting tools of Examples 24 to 30 were produced. Here, the volume ratio between A-structures and B-structures was adjusted using the ratio between the argon content and the oxygen content when the plasma machining was performed.

Respective cutting tools of Examples 24 to 30 were produced by a similar method to Example 3, except that the volume ratio of the B-structures in the hard sintered body was different as shown under "surface region" in the column of "volume ratio of B-structures" in Table 2, and that the x-ray intensity was different as shown under IBO/(IBO+IBN).

Comparative Example 5

The cutting tool of Comparative Example 5 was produced by a similar method to Example 24 except that the electron beam machining for forming B-structures was not performed.

Comparative Example 6

The cutting tool of Comparative Example 6 was produced by a similar method to Example 24, except that electron-beam machining was performed on the whole surface of the hard sintered body on the rake face side so that the whole surface of the hard sintered body on the rake face side was made up of B-structures.

TABLE 2

| | cBN content (%) | B-structure | state of mixture | average diameter of B-structure regions (μm) |
|---|---|---|---|---|
| Example 17 | 45 | hexagonal + boron oxide | B-structures are scattered over A-structures | 0.5 |
| Example 18 | 45 | hexagonal + boron oxide | B-structures are scattered over A-structures | 1 |
| Example 19 | 45 | hexagonal + boron oxide | B-structures are scattered over A-structures | 5 |
| Example 20 | 45 | hexagonal + boron oxide | B-structures are scattered over A-structures | 10 |
| Example 21 | 45 | hexagonal + boron oxide | B-structures are scattered over A-structures | 25 |
| Example 22 | 45 | hexagonal + boron oxide | B-structures are scattered over A-structures | 40 |
| Example 23 | 45 | hexagonal + boron oxide | B-structures are scattered over A-structures | 70 |
| Example 24 | 90 | hexagonal + amorphous + boron oxide | mixture of atoms | — |
| Example 25 | 90 | hexagonal + amorphous + boron oxide | mixture of atoms | — |
| Example 26 | 90 | hexagonal + amorphous + boron oxide | mixture of atoms | — |
| Example 27 | 90 | hexagonal + amorphous + boron oxide | mixture of atoms | — |
| Example 28 | 90 | hexagonal + amorphous + boron oxide | mixture of atoms | — |
| Example 29 | 90 | hexagonal + amorphous + boron oxide | mixture of atoms | — |
| Example 30 | 90 | hexagonal + amorphous + boron oxide | mixture of atoms | — |
| Comparative Example 5 | 90 | hexagonal boron nitride | no B-structures | — |
| Comparative Example 6 | 90 | hexagonal boron nitride | B-structures only | — |

| | x-ray intensity ratio | | | depth of presence of B-structures (μm) | volume ratio of B-structure (vol %) | |
|---|---|---|---|---|---|---|
| | Ih (0001)/Ic (111) | background ratio | IBO/(IBN + IBO) | | surface region | edge ridgeline |
| Example 17 | 0.35 | — | 0.25 | 4 | 15 | undetected |
| Example 18 | 0.35 | — | 0.25 | 4 | 15 | undetected |
| Example 19 | 0.35 | — | 0.25 | 4 | 15 | undetected |
| Example 20 | 0.35 | — | 0.25 | 4 | 15 | undetected |
| Example 21 | 0.35 | — | 0.25 | 4 | 15 | undetected |
| Example 22 | 0.35 | — | 0.25 | 4 | 15 | undetected |
| Example 23 | 0.35 | — | 0.25 | 4 | 15 | undetected |
| Example 24 | 0.11 | 0.5 | 0.001 | 3 | 15 | undetected |
| Example 25 | 0.11 | 1.1 | 0.07 | 3 | 20 | undetected |
| Example 26 | 0.11 | 2 | 0.15 | 3 | 25 | undetected |
| Example 27 | 0.11 | 8 | 0.3 | 3 | 40 | undetected |
| Example 28 | 0.11 | 15 | 0.45 | 3 | 50 | undetected |
| Example 29 | 0.11 | 1.5 | 0.8 | 3 | 55 | undetected |
| Example 30 | 0.11 | 3 | 2 | 3 | 60 | undetected |
| Comparative Example 5 | — | — | — | — | 0 | undetected |
| Comparative Example 6 | — | — | — | 8 | 99 | 99 |

Analysis of Hard Sintered Body

"cBN content" in Tables 1 and 2 was calculated in the following manner. First, respective hard sintered bodies produced for Examples and Comparative Examples were mirror-polished (note that the thickness by which they were polished away was restricted to less than 50 μm), and a photograph of the crystal structure of the hard sintered body in an arbitrary region was taken at 2000× magnification with an electron microscope. As a result, black, gray, and white regions were observed. An energy dispersive x-ray spectroscopy (EDX) apparatus provided as an accessory was used to confirm that the black region was cBN particles, and the gray and white regions were the binder phase.

Next, the 2000× photograph thus taken was binarized by means of image processing software. The total area of the regions occupied by cBN particles (black regions) in the photograph was calculated. The ratio of the black regions to the cBN sintered body in the photograph was represented in percentage to be used as the percentage by volume under "cBN content" in Tables 1 and 2.

Respective characteristics in the cells of columns "B-structures," "state of mixture," and "volume ratio of B-structures" in Tables 1 and 2 were determined/calculated by measurement through TEM observation and EBSP analysis. Further, respective numerical values under "Ih (0001)/Ic (111)," "background ratio" and "IBO/(IBO+IBN)" under "x-ray intensity ratio" in Tables 1 and 2 were calculated through x-ray diffraction and XPS analysis. Further, "depth of presence of B-structure" in Tables 1 and 2 was calculated in the following way. A cross section perpendicular to the rake face of the hard sintered body was observed with an SEM and a TEM and electron diffraction (EDS) was applied to this. At this time, the maximum depth at which the B-structure was detected was calculated.

"Average diameter of B-structure regions" in Tables 1 and 2 was determined in the following way. The hard sintered body on the rake face side was measured through EBSP, the area of a region in which crystal grains having the B-structure gathered was calculated, and the diameter of a circle having the same area as the calculated area was calculated. This operation was performed ten times. The average of the circle diameters of respective measurements is indicated.

From the results above, the following has become clear. Specifically, the cutting tools of Examples 1 to 30 are each a cutting tool including a hard sintered body in at least a cutting edge. The cutting tool has a rake face and a flank face. The rake face has a chip breaker in a protruded shape or an uneven shape. The hard sintered body contains at least 20% by volume of cubic boron nitride. A region of 20 μm or less from the surface of the hard sintered body on the rake face side includes A-structures made of cubic boron nitride and B-structures made of at least one selected from the group consisting of hexagonal boron nitride, amorphous boron nitride, and boron oxide. The volume ratio of the B-structures to the sum of the A-structures and the B-structures, namely B/(A+B), is not less than 5% by volume and not more than 90% by volume.

Respective hard sintered bodies of Examples and Comparative Examples thus obtained were used to produce cutting tools having the tool shape as described below, and Cutting Tests 1 to 3 were conducted. The results of the tests are shown in Tables 3 to 5.

<Cutting Test 1>

On respective cutting tools of Examples 1 to 23 and Comparative Examples 1 to 4, a continuous machining test was performed under the following conditions.

Workpiece: carburized workpiece of SCM 435, round bar of 50 mm in diameter
Hardness of workpiece: HRC60
Cutting conditions: cutting speed V=120 /min
feed rate f=0.15 mm/rev.
depth of cut d=0.2 mm
DRY/WET: DRY

TABLE 3

| | cutting length up to expiration of tool life (km) |
|---|---|
| Example 1 | 9.6 |
| Example 2 | 12 |
| Example 3 | 10.2 |
| Example 4 | 9.5 |
| Example 5 | 8.2 |
| Example 6 | 8.2 |
| Example 7 | 7.9 |
| Example 8 | 7.6 |
| Comparative Example 1 | 4.2 (chipping) |
| Example 9 | 10.1 |
| Example 10 | 10.4 |
| Example 11 | 12.2 |
| Example 12 | 12.4 |
| Example 13 | 11.7 |
| Example 14 | 11.0 |
| Example 15 | 8.4 |

TABLE 3-continued

| | cutting length up to expiration of tool life (km) |
|---|---|
| Example 16 | 8.0 |
| Comparative Example 2 | 7.5 |
| Comparative Example 3 | 7.1 |
| Comparative Example 4 | 5 |
| Example 17 | 8.1 |
| Example 18 | 9.2 |
| Example 19 | 10.6 |
| Example 20 | 11.5 |
| Example 21 | 12.4 |
| Example 22 | 9.8 |
| Example 23 | 7.1 (abnormal wear) |

Under "cutting length up to expiration of tool life" in Table 3, the cutting length (km) before the dimensional accuracy φ of the round bar goes beyond 49.6 mm±10 μm is shown. A longer cutting length represents a longer tool life. Regarding the continuous cutting test, as the chip flows with higher stability, the cutting resistance is lower to provide a longer life with stability.

As clearly seen from Table 3, the cutting tools of Examples 1 to 8 have an extended tool life relative to the cutting tool of Comparative Example 1. Likewise, it is clearly seen from Table 3 that the cutting tools of Examples 9 to 16 have an extended tool life relative to the cutting tool of Comparative Example 2, and the cutting tools of Examples 17 to 23 have an extended tool life relative to the cutting tools of Comparative Examples 3 and 4.

<Cutting Test 2>

On respective cutting tools of Examples 1 to 23 and Comparative Examples 1 to 4, an intermittent machining test was performed under the following conditions.

Workpiece: carburized workpiece of SCM 435, round bar of 50 mm in diameter
Hardness of workpiece: HRC60
Cutting conditions: cutting speed V=150 m/min
feed rate f=0.1 mm/rev.
depth of cut d=0.25 mm
DRY/WET: DRY

TABLE 4

| | cutting length up to expiration of tool life (km) |
|---|---|
| Example 1 | 8.8 |
| Example 2 | 10.6 |
| Example 3 | 12.0 |
| Example 4 | 9.9 |
| Example 5 | 9.2 |
| Example 6 | 8.5 |
| Example 7 | 7.9 |
| Example 8 | 7.6 |
| Comparative Example 1 | 2.5 (chipping) |
| Example 9 | 10.3 |
| Example 10 | 10.7 |
| Example 11 | 11.6 |
| Example 12 | 12.3 |
| Example 13 | 12.2 |
| Example 14 | 11.2 |
| Example 15 | 7.1 (chipping) |
| Example 16 | 6.3 |
| Comparative Example 2 | 8.4 |
| Comparative Example 3 | 7 |
| Comparative Example 4 | 4.3 (chipping) |
| Example 17 | 10.2 |
| Example 18 | 10.8 |
| Example 19 | 10.8 |

TABLE 4-continued

| | cutting length up to expiration of tool life (km) |
|---|---|
| Example 20 | 12.5 |
| Example 21 | 11.5 |
| Example 22 | 9.9 |
| Example 23 | 7.3 (abnormal wear) |

Under "cutting length up to expiration of tool life" in Table 4, the cutting length (km) before the dimensional accuracy φ of the round bar goes beyond 49.5 mm±10 μm is shown. A longer cutting length represents a longer tool life. Regarding the intermittent cutting test, as the workpiece adheres to a greater extent, the cutting resistance increases, resulting in deteriorated dimensional accuracy and shortened tool life.

As clearly seen from Table 4, the cutting tools of Examples 1 to 8 have an extended tool life relative to the cutting tool of Comparative Example 1. Likewise, it is clearly seen from Table 4 that the cutting tools of Examples 9 to 16 have an extended tool life relative to the cutting tool of Comparative Example 2, and the cutting tools of Examples 17 to 23 have an extended tool life relative to the cutting tools of Comparative Examples 3 and 4.

<Cutting Test 3>

On respective cutting tools of Examples 1 to 8 and Examples 24 to 32 as well as Comparative Examples 1, 5, and 6, a continuous machining test was performed under the following conditions.

Workpiece: refined workpiece of SCM 420, round bar of 50 mm in diameter

Hardness of workpiece: HRC50

Cutting conditions: cutting speed V=80 m/min feed rate f=0.2 mm/rev.

depth of cut d=0.5 mm

DRY/WET: DRY

TABLE 5

| | cutting length up to expiration of tool life (km) |
|---|---|
| Example 1 | 7.5 |
| Example 2 | 8.0 |
| Example 3 | 9.0 |
| Example 4 | 9.9 |
| Example 5 | 11.1 |
| Example 6 | 11.8 |
| Example 7 | 11.3 |
| Example 8 | 10.5 |
| Comparative Example 1 | 5.2 |
| Example 24 | 8.2 |
| Example 25 | 10.4 |
| Example 26 | 10.9 |
| Example 27 | 12.3 |
| Example 28 | 11.2 |
| Example 29 | 10.3 |
| Example 30 | 7.8 |
| Comparative Example 5 | 6.5 |
| Comparative Example 6 | 5.1 (chipping) |

Under "cutting length up to expiration of tool life" in Table 5, the cutting length (km) before the dimensional accuracy φ of the round bar goes beyond 49 mm±10 μm is shown. A longer cutting length represents a longer tool life. Regarding the continuous cutting test, as the chip flows with higher stability, the cutting resistance is lower to provide a longer life.

As clearly seen from Table 5, the cutting tools of Examples 1 to 8 have an extended tool life relative to the cutting tool of Comparative Example 1. It is also clearly seen from Table 5 that the cutting tools of Examples 24 to 30 have an extended tool life relative to the cutting tools of Comparative Examples 5 and 6.

From the results of Tables 3 to 5, it has been found that the cutting tools of the Examples have suppressed chip adhesion and thus reduced cutting resistance, so that their tool life is remarkably improved relative to the cutting tools of the Comparative Examples. Namely, it has been confirmed that the cutting tool of the present invention has both the characteristics of the A-structure and the characteristics of the B-structure and accordingly have wear resistance, strength, slidability and adhesion resistance together.

While the embodiments and examples of the present invention have been described, it is originally intended that the components and features of the above-described embodiments and examples may be combined as appropriate.

It should be construed that embodiments and examples disclosed herein are by way of illustration in all respects, not by way of limitation. It is intended that the scope of the present invention is defined by claims, not by the above description, and encompasses all modifications and variations equivalent in meaning and scope to the claims.

Reference Signs List

1 cutting tool; 2 rake face; 3 flank face; 4 hard sintered body; 5 chip breaker; 6 edge ridgeline

The invention claimed is:

1. A cutting tool comprising a hard sintered body in at least a cutting edge,
    said cutting tool having a rake face and a flank face,
    said rake face having a chip breaker in a protruded or uneven shape,
    said hard sintered body having said rake face and said flank face,
    said hard sintered body containing at least 20% by volume of cubic boron nitride,
    a region of not more than 20 μm in a depth direction from a surface of said hard sintered body on the rake face side including A-structures made of cubic boron nitride and B-structures made of at least one selected from the group consisting of hexagonal boron nitride, amorphous boron nitride, and boron oxide, and a volume ratio of said B-structures to a sum of said A-structures and said B-structures, B/(A+B), being not less than 5% by volume and not more than 90% by volume, and
    said B-structures are obtained by transforming said A-structures in the surface of said hard sintered body using any of electrical discharge machining, electron beam machining, laser machining, and plasma arc machining.

2. The cutting tool according to claim 1, wherein
    the cutting tool has a face connecting said rake face and said flank face, and said face includes at least one face selected from the group consisting of a land face, a negative land face, and honing portion, and
    a region of not more than 20 μm in the depth direction from a surface of said face has said volume ratio B/(A+B) of not less than 0.1% by volume and not more than 5% by volume.

3. The cutting tool according to claim 1, wherein
    the cutting tool has a face connecting said rake face and said flank face, and said face includes at least one face selected from the group consisting of a land face, a negative land face, and a honing portion, and in a region of not more than 10 μm from a cutting edge ridgeline where any two of said rake face, said flank face, said land face, said negative land face, and said honing portion abut on each other, said volume ratio B/(A+B) is not less than 0.1% by volume and not more than 5% by volume.

4. The cutting tool according to claim 1, wherein
in said hard sintered body, regions each containing at least 90% by volume of said B-structures are scattered over said A-structures.

5. The cutting tool according to claim 1, wherein Ih (0001)/Ic (111) is not less than 0.1 and not more than 10, where Ic (111) is an integrated intensity of x-ray diffraction of a (111) plane of said cubic boron nitride and Ih (0001) is an integrated intensity of x-ray diffraction of a (0001) plane of said hexagonal boron nitride, when x-ray diffraction is performed on said hard sintered body on said rake face side.

6. The cutting tool according to claim 1, wherein
an integrated intensity of a background component except for a clear diffraction peak of 2θ=10 to 30° when x-ray diffraction is performed on the surface of said hard sintered body on said rake face side is not less than 1.1 times and not more than 10 times as high as an integrated intensity of a background component except for a clear diffraction peak of 2θ=10 to 30° when x-ray diffraction is performed on a surface obtained by cutting the surface of said hard sintered body on said rake face side by at least 0.4 mm.

7. The cutting tool according to claim 1, wherein
IBO/(IBO+IBN) is not less than 0.05 and not more than 0.9, where IBN is an integrated intensity of a signal of B representing B—N bond and IBO is an integrated intensity of a signal of B representing B—0 bond, when XPS analysis is performed on said hard sintered body on said rake face side.

8. The cutting tool according to claim 1, wherein
the region is in the hard sintered body.

* * * * *